March 4, 1930. B. L. HARTZ 1,749,535
SYSTEM FOR HOLDING MILK
Filed Nov. 16, 1925 6 Sheets-Sheet 2
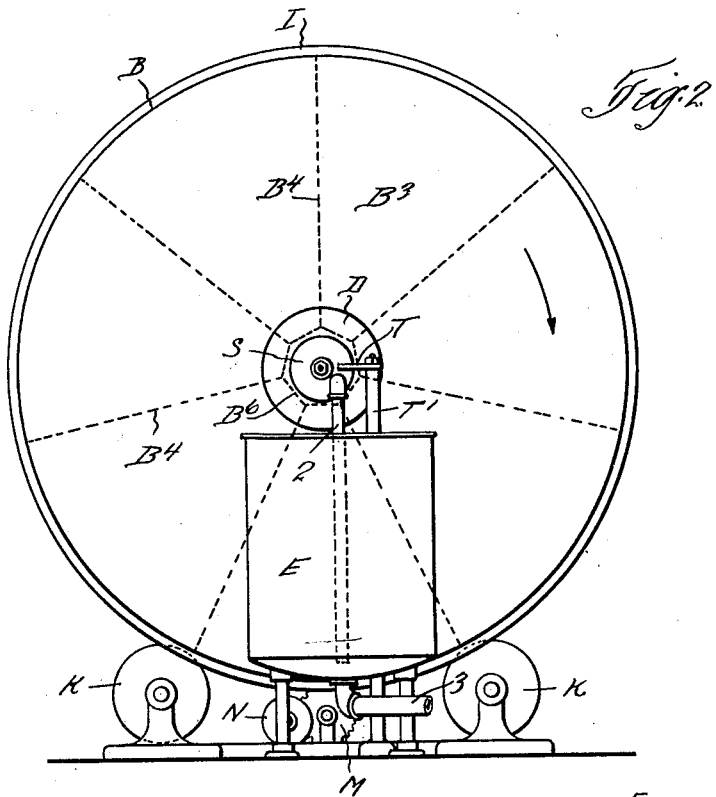
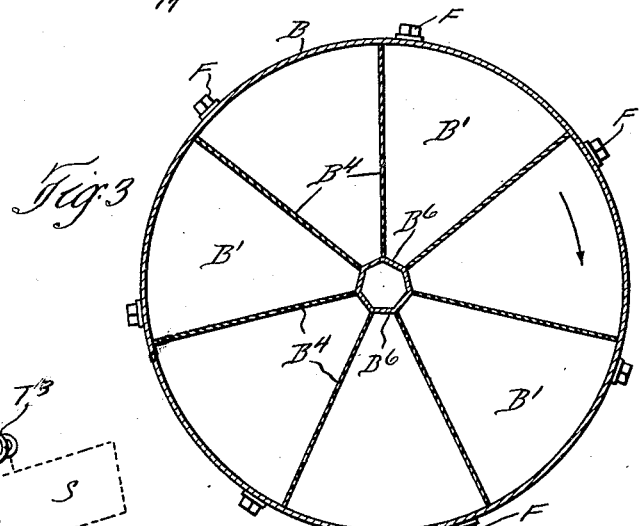
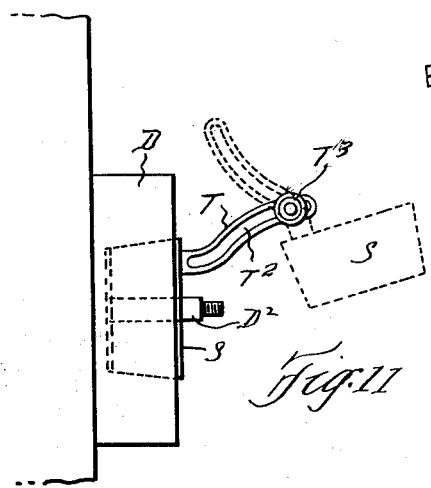
Inventor
Barge L. Hartz
By Hull, Brock & West
Attys.

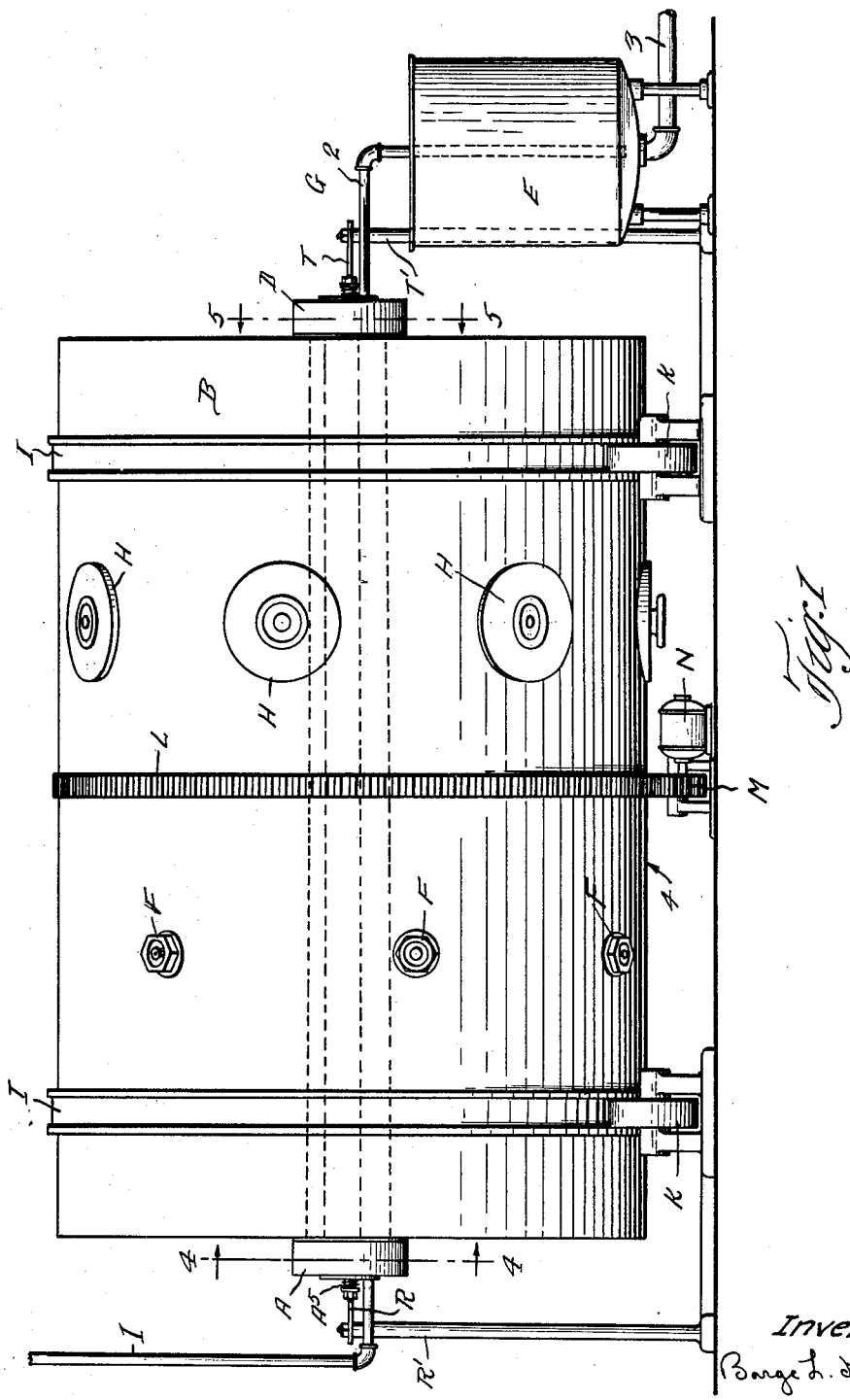

March 4, 1930.  B. L. HARTZ  1,749,535
SYSTEM FOR HOLDING MILK
Filed Nov. 16, 1925  6 Sheets-Sheet 4
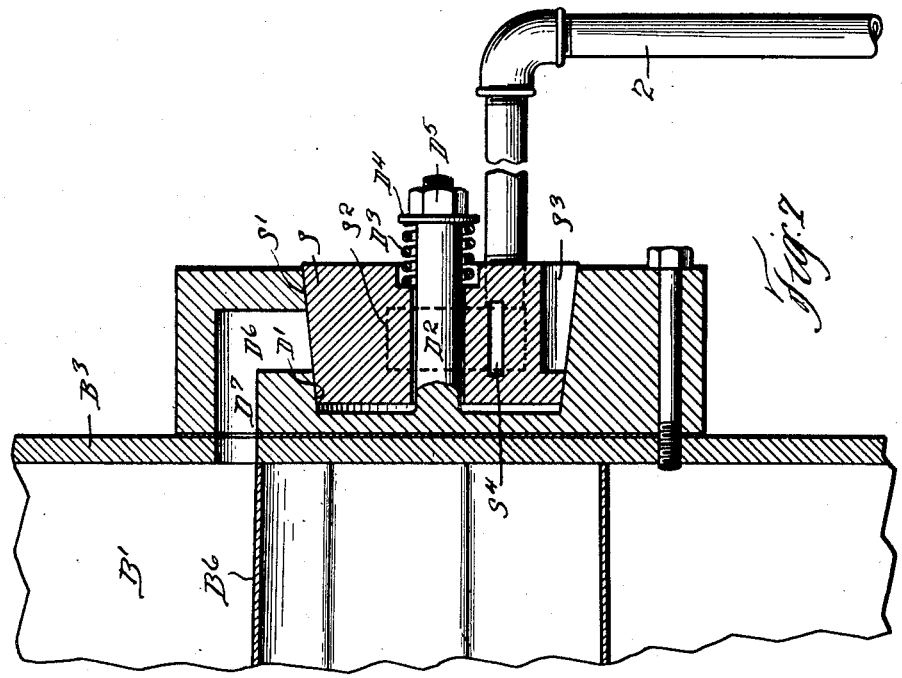
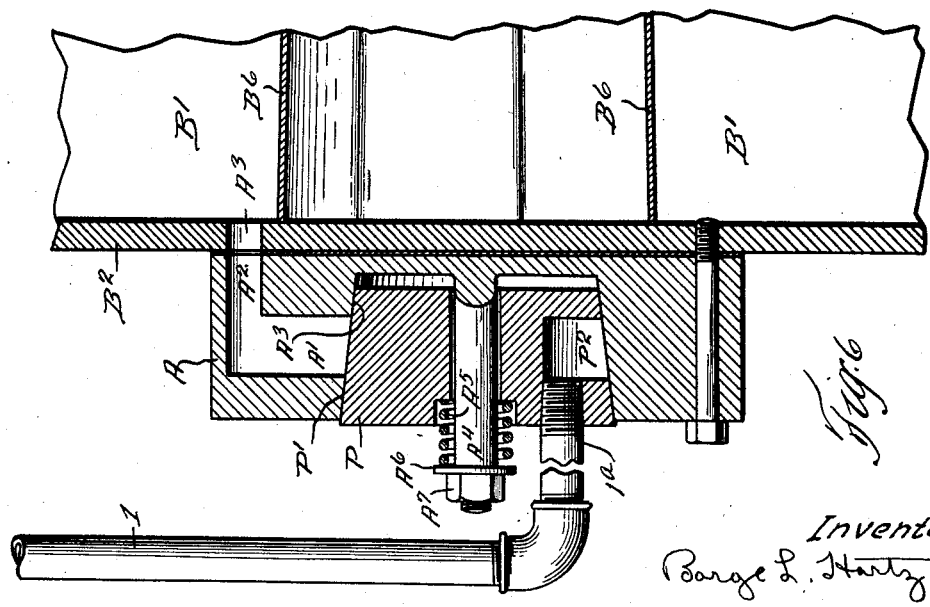

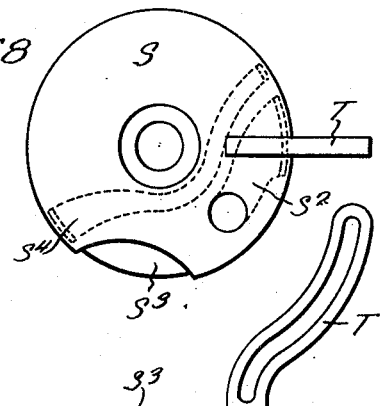
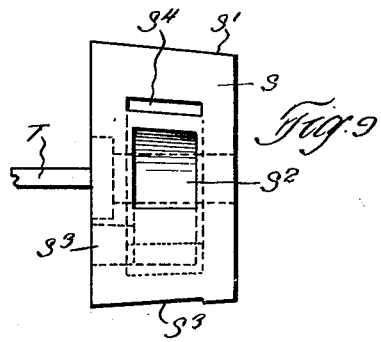
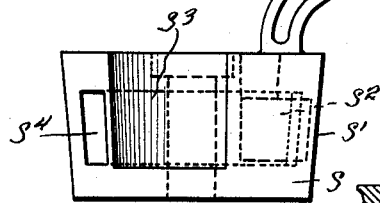
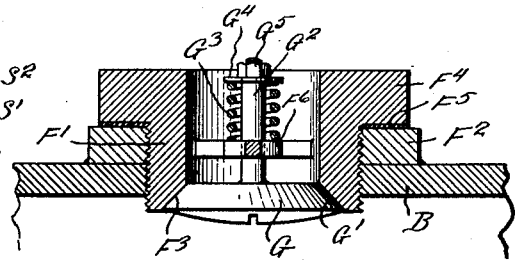
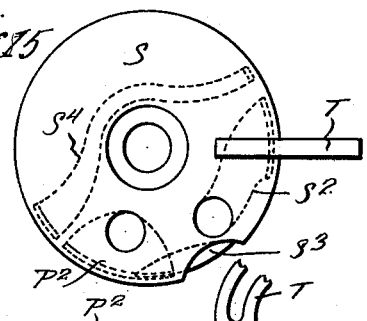
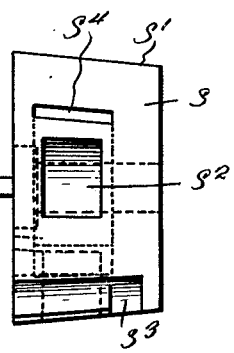
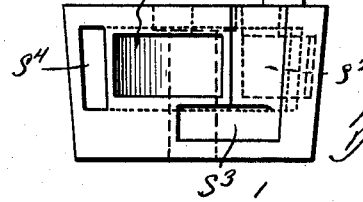

March 4, 1930.  B. L. HARTZ  1,749,535
SYSTEM FOR HOLDING MILK
Filed Nov. 16, 1925   6 Sheets-Sheet 6
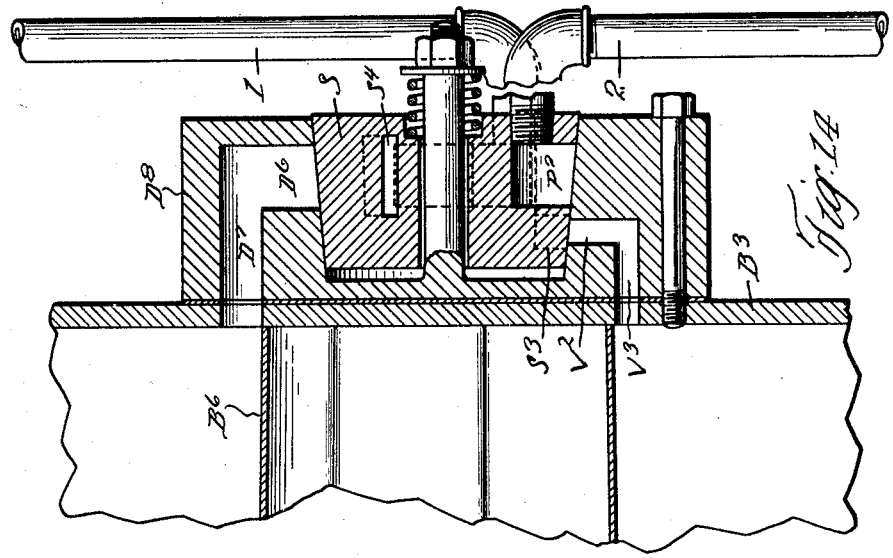
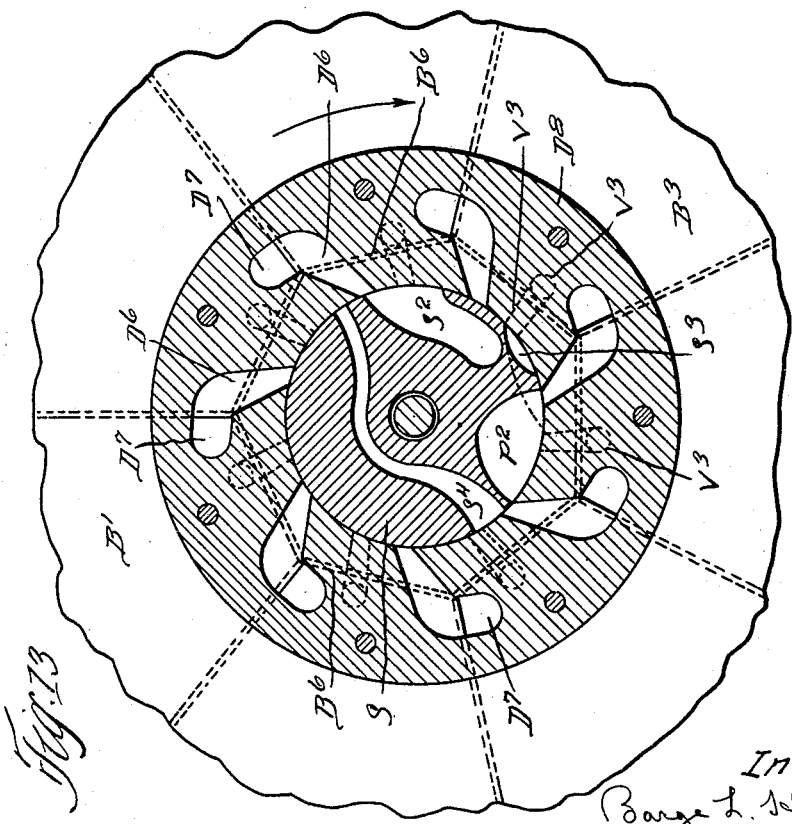
Inventor
Barge L. Hartz
By Hull, Brock & West
Attys.

Patented Mar. 4, 1930

1,749,535

UNITED STATES PATENT OFFICE

BARGE L. HARTZ, OF ELYRIA, OHIO

SYSTEM FOR HOLDING MILK

Application filed November 16, 1925. Serial No. 69,364.

This invention relates to systems or apparatus for holding milk during the process of pasteurizing the same. In the systems or apparatus to which my invention relates, the milk is conveyed from a heater to holding tanks, wherein it is held for a predetermined time and then released and conveyed to a cooler; in some of these systems, the movement of the milk from the heater to the holding tanks is automatically controlled by a timed distributing valve.

Figure 4:
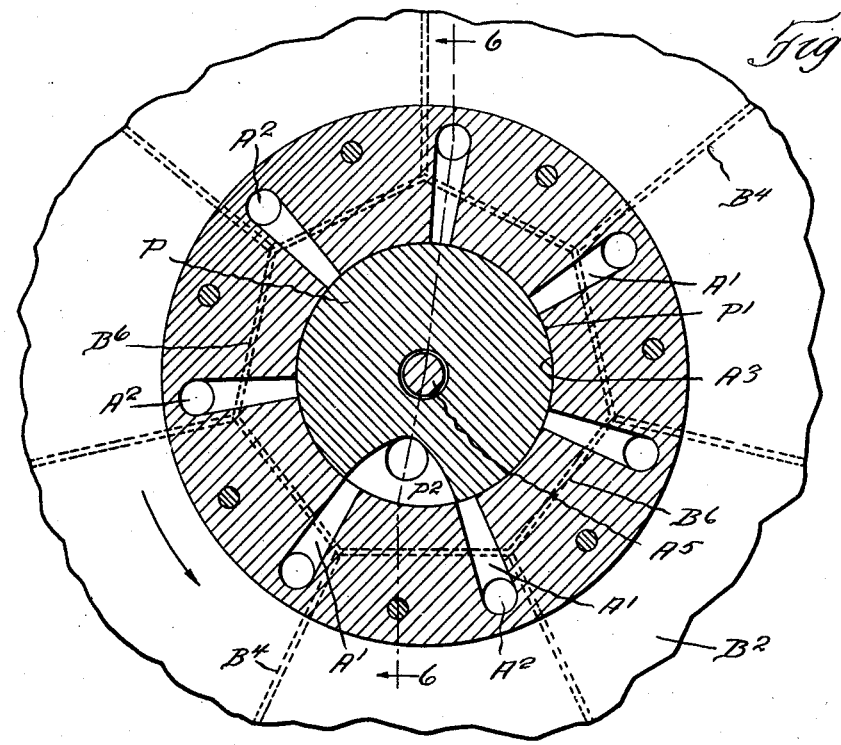
Figure 5:
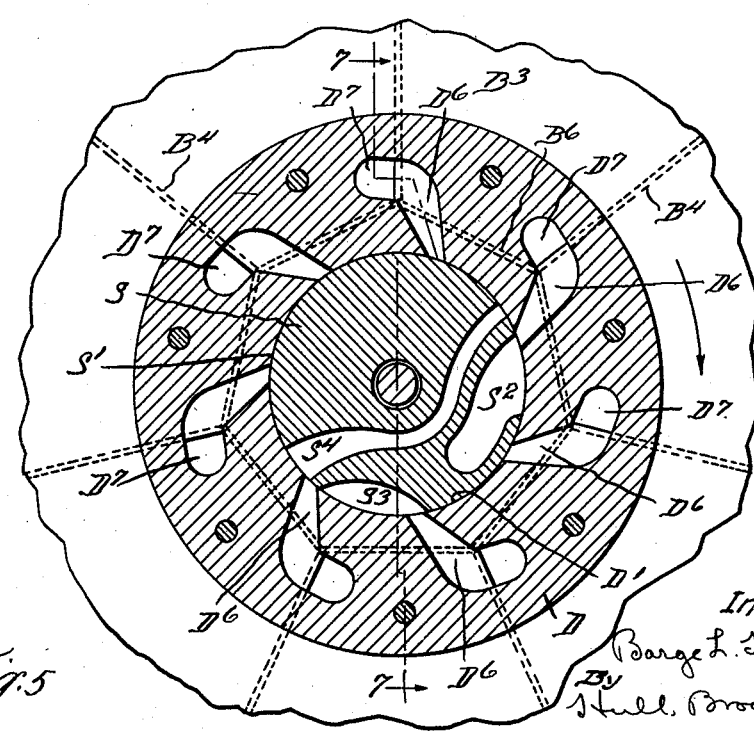

My invention relates to systems of the type referred to and more particularly to the means (including a distributing valve of this character) for supplying the heated milk to a plurality of holding tanks; to the means, including a timed distributing valve, for automatically emptying the said holding tanks; to a construction and arrangement of tanks which will insure the efficient filling and emptying of the same; and to certain constructions and arrangements of parts whereby the delivery to any of the holding receptacles of other than the heated milk intended therefor is prevented. The invention also includes certain constructions, combinations and arrangements of parts which will be set forth in the claims and will be pointed out in connection with the detailed description of the system shown in the drawings, wherein Fig. 1 represents a side elevation of the system or apparatus; Fig. 2 an end elevation of the same; Fig. 3 a vertical sectional view through the container and the tanks therein; Figs. 4 and 5 sectional views through the filling and emptying valves, respectively, the said views corresponding respectively to the lines 4—4 and 5—5 of Fig. 1; Figs. 6 and 7 details in section through the filling and emptying valves and the parts of the tanks adjacent thereto, the views corresponding respectively to the line 6—6 of Fig. 4 and the line 7—7 of Fig. 5; Fig. 8 a front elevation and Fig. 9 a side elevation of the plug of the emptying valve; Fig. 10 a bottom elevation of the said plug; Fig. 11 an elevation showing one of the aforesaid valves in side elevation, the dotted lines indicating the position to which the plug may be swung out for the purpose of cleaning or replacement; Fig. 12 a detail in section through the air-venting valve for a holding tank; Fig. 13 a view, similar to Figs. 4 and 5, of a combined filling and emptying valve which may be substituted for the separate valves shown in the former views; Fig. 14 a sectional view corresponding to the line 14—14 of Fig. 13; and Figs. 15, 16 and 17 are views, corresponding respectively to Figs. 8, 9 and 10, of the combined filling and emptying plug.

Referring more particularly to Figs. 1–12 inclusive, the system may be described as consisting generally of a radially arranged series of holding tanks supported for rotation about a common horizontal axis and forming part of a container the outer wall of which constitutes a continuous peripheral wall for the tanks formed within said container. One end of the container is provided with an automatic filling valve whereby the heated milk may be delivered successively to the tanks within said container, the other end of the tank being provided with an automatic emptying valve which is arranged to empty the milk from the various tanks after the milk shall have been held therein for the proper length of time. Means are provided for rotating the container; and various details of constructions and arrangements of parts are provided which enable the system to operate in a particularly efficient manner.

Describing by reference characters the various parts illustrated in Figs. 1–12 inclusive, 1 denotes a distributing pipe by means of which the heated milk is delivered through an automatically operating filling valve, the outer casing whereof is indicated generally at A, into a radially arranged series of tanks B′ provided within the outer cylindrical wall B of a container having heads B² and B³. After the milk has been held for the proper length of time in each tank B′, it is automatically delivered through the emptying valve (the outer casing whereof is indicated at D) and a pipe 2 into a receiving tank E, whence it is conducted by the pipe 3 to the cooler.

The container 4 is shown as divided into a plurality of radially-extending segmental tanks B′, each tank being formed by the outer wall B of the container and by radial walls B⁴ and B⁵ and an inner or bottom wall B⁶. Each wall B⁶ is preferably flat and all of the walls B⁶ converge toward the axis of the container B, from the filling end toward the emptying end of their respective tanks, as will be seen in Figs. 4, 5, 6 and 7, to insure the complete emptying of each tank at the proper time. Each tank B′ is provided with an inwardly opening check valve indicated generally at F. Each check valve comprises a casing F′ which is threaded through a short bushing F² in the wall B and is provided at its inner end with a beveled seat F³ for the valve proper. The outer end of each casing F′ is enlarged and made in the shape of a nut, as indicated at F⁴, enabling it to receive a wrench whereby the casing may be screwed into place. A washer F⁵ is shown as interposed between the head F⁴ and the short bushing F². Within the casing is the valve proper which comprises a head G having a beveled seating portion G′ adapted to engage the seat F³, the head being provided with a stem G² which projects through an opening in the center of a spider F⁶ within the bore of the casing F′, the valve being normally held to its seat by a light coiled spring G³ engaging the said spider at one end and pressing at its other end against a washer G⁴ held upon the stem by a nut G⁵.

The outer wall B of the container 4 is provided with a manhole and a cover therefor for each of the tanks B′, as indicated at H on Fig. 1, whereby access may be had to the tanks for purpose of cleaning and repair.

The cylindrical wall B of the container is provided with a track I adjacent each end thereof, whereby the said container and the tank therein are supported upon rollers K. Intermediate of these tracks the container is provided with a large circumferential gear L meshing with a pinion M driven by a motor N. By means of the parts I–N inclusive, the container 4 may be rotated about its horizontal axis.

As is well known, the milk to be pasteurized is heated to a temperature of about 145° F. and must be held at such temperature for about 30 minutes before it may be cooled and delivered into bottles or other containers. The rotation of the container 4 will be so timed and the number of tanks therein will be such that, during each rotation of said container, each tank therein will be filled and the milk in such tank will be held for a period of 30 minutes, after which said tank will be automatically emptied. While the number of tanks in the container may be varied seven such tanks are shown herein and, with this number of tanks, each tank will be filled and the milk in such tank will be held while the four succeeding tanks are filled, after which the tank will be emptied. With this arrangement, each tank, after emptying, will travel its own angular distance about the axis of the container before being brought to filling position. The construction and arrangement of valve mechanism whereby the automatic filling and emptying may be accomplished will now be described.

*Filling valve*

The filling valve comprises an outer casing A which is secured to and carried by the head B² of the container 4. The casing is provided with seven angular ports (one for each tank B′) each comprising a radially extending passage A′ and a horizontally extending passage A², each port communicating with a tank B′ through an opening A³ provided in the head B². The casing A is provided with a frusto-conical seat A³ for the reception of a plug P having a correspondingly-shaped seating wall P′, the plug being mounted upon a stud A⁴ projecting from the central portion of the bottom of the casing A and being yieldingly held to its seat in said casing by a spring A⁵ seated at its inner end within a recess in said plug and bearing at its outer end against a washer A⁶ which is held on the plug by means of a nut A⁷. The plug P is prevented from rotating by means of an arm R secured thereto and anchored to a rod or post R′.

The pipe 1 is connected at its delivery end with a segmental port P² in the plug which port is adapted to register successively with the inner ends of the passages A′ as the container 4 and the casing A rotate. It will be noted that the outer end of the port P² is of such width that the forward wall thereof is adapted to register with a passage A′ moving toward it before the rear wall is out of register with the passage A′ which is leaving it. This arrangement insures ample time for filling each tank B′ and enables the milk to flow through the filling pipe 1 without backing up in the same and hence creating a head which would tend to cause leakage between the plug P and the casing A.

It will be noted that the parts are so arranged that the filling of each tank B′ begins as the bottom wall B⁶ thereof is being brought beneath the segmental port B²; also that the filling passage A² communicates with each tank adjacent to the wall B⁴ which is first moved below the port P². It is, of course, necessary to vent each of the tanks B′ during the filling operation, and this venting arrangement is shown herein as combined with an emptying valve, which will now be described.

*Emptying valve*

The emptying valve comprises a casing D which is carried by the head B³ of the container, the casing having a central frusto-conical seat D′ for the correspondingly-shaped seating wall S′ of a valve plug S. The plug is mounted upon a stud D² projecting from the central portion of the bottom of the casing D and is yieldingly held to its seat in said casing by a spring D³ seated at its inner end within a recess in said plug and bearing at its outer end against a washer D⁴ which is held on the plug by a nut D⁵. The plug S is prevented from rotating by means of an arm T projecting therefrom and secured to a post T'.

The casing D is provided with a plurality of ports each comprising a passage D⁶ extending outwardly from the seat D' across the plane of the radial wall B⁴ at the rear thereof and merging with an axially extending passage D⁷ communicating with the appropriate tank B' immediately at the rear of such wall and immediately above the thin bottom wall B⁶ at the bottom of the angle formed by and between such walls.

The plug S is provided with an emptying port, S² with the inner end of which the delivery pipe D communicates. This port is so arranged that its receiving end will communicate with the delivery passage D⁶ of a tank B' after the said tank shall have traveled a sufficient distance from its filling position to enable the milk therein to be held for the proper length of time—say thirty minutes. The parts are so arranged that, when this time shall have elapsed, the forward wall B⁴ of said compartment will have passed beyond a vertical position and the inner end D⁶ of its emptying port will have begun to register with the port S². The emptying ports are of such cross-sectional area as to insure complete emptying of each tank B' before the natural drain pocket formed between the forward wall B⁴ and the thin bottom wall B⁶ is eliminated by further movement of said tank and, for this reason, the receiving end of the port S² is of less width than the distance between adjacent emptying ports D⁶, D⁷. This complete emptying of each tank is also faciltated by the downward slope of the bottom wall of each tank from the filling valve toward the emptying valve at the time of the emptying operation. In other words, the construction of the tanks and the arrangement of the emptying ports is such as to produce a natural drainage of the tanks toward such ports during the emptying operation.

The plug S' is also provided with a segmental port S³ in the bottom thereof, which port is adapted to register with a tank B' at the time when the said tank is in register with the appropriate ports A', A² for filling the same. The port S³, as will be noted from Figs. 5 and 7 serves to vent each tank as it is being filled. Thus the ports D⁶, D⁷ and the plug S serve the double function of automatically emptying the tanks after the milk therein shall have been held for the proper length of time and also of venting each of the said tanks during the filling operation. In addition to the ports S² and S³, the plug S is provided with a port S⁴ extending thereacross and having its ends communicating with diametrically opposed parts of the peripheral wall of said plug, it being noted that one end of such port is above the opposite end and is in position to receive any leakage that may enter the space between the plug S and the casing D and deliver such leakage into a tank which has been filled but the milk wherein has not been held for as long a time as the milk which is delivered thereto by reason of such leakage. This not only prevents the loss of milk by leakage but also insures the milk being held a sufficient time before being delivered to the distributing tank E'.

During the emptying operation, the inwardly opening check valves, the casings whereof are indicated at F, will operate in the usual manner to permit the complete emptying of the tanks.

In Fig. 11 there is shown in detail the manner in which the filling and emptying plugs are mounted in order to permit the same to be conveniently removed for cleaning purposes, the particular plug shown being the emptying plug. The arm T which supports the said plug against rotation is provided with a slot T² which receives the reduced upper end of the post T', being retained thereon by a nut T³. By removing the nut D⁵, washer D⁴ and spring D³, and by removing the connection 1ª of the conduit, the plugs may each be moved outwardly to a position such as shown in dotted lines in Fig. 11 to permit cleaning thereof and of the interior of the respective plug casings. The filling plug, as previously stated, is mounted in the same manner and for the same purpose.

In Figs. 13–17 inclusive there is shown a modification of my invention wherein I am enabled to perform the operations of filling, emptying, and venting during the filling operations, by means of a single valve.

The valve casing is provided with both the filling and the emptying ports, while the plug is provided with a filling port in addition to the ports shown and described in connection with the emptying plug of the prior embodiment of my invention.

In these views, the valve casing is indicated generally at V and is provided with ports D⁶, D⁷ arranged in the same manner with respect to each other and with respect to the tanks B', as is the case with the emptying valve in my prior modification. In addition, the valve casing is provided with venting ports V², V³, alternating with respect to the ports D⁶, D⁷.

The plug S is provided with the ports S² arranged to empty the tanks in the same manner as the corresponding ports in the prior modification; also with the venting port S³ which is adapted to register with the ports V², V³, while a tank B' is being filled through the ports D⁶, D⁷, which at this stage of the operation serve as filling ports, receiving their supply through the port P² which communicates with the filling pipe 1. In both forms of my invention, valve mechanism is provided whereby a series of tanks, grouped about a common axis, are filled successively through the rotation of the tanks about such axis, are vented during such filling operation by reason of such rotation, and are emptied automatically by reason of such rotation.

It will be evident that, by the construction and arrangement of parts described herein, I have produced an apparatus or system for holding milk wherein the filling and emptying operations may be accomplished by gravity, which is capable of operating in a most efficient manner to perform all of the necessary operations, and which is capable of withstanding the ordinary incidents of use.

Having thus described my invention, what I claim is:—

1. In a system or apparatus for holding milk, the combination of a container, and means for rotating the same about a horizontal axis, of a series of radially extending tanks within said container, the heads of the container and the outer wall thereof constituting end and outer walls for the tanks, check valves in the outer wall of the container arranged to admit air to the tanks therein, a conduit for supplying milk to the tanks in said container, valve mechanism comprising a casing secured to and concentric with one end of the container and having ports communicating with the tanks therein, a plug within said casing having a port which communicates with the conduit and which is adapted to register with the casing ports successively, a valve casing at the opposite end of the container and having emptying ports communicating with the tanks therein, and a valve plug within the last-mentioned casing having an emptying port adapted to register successively with the ports in said casing and also having a venting port angularly spaced from such emptying port and adapted to register successively with the ports in the last-mentioned casing thereby to vent each tank during the filling operation, the last-mentioned plug being provided with a port extending therethrough adapted to deliver milk that may leak from one of the said tanks through an emptying port in the last-mentioned casing into a tank further remote from the emptying port in said plug.

2. In a system or apparatus for holding milk, the combination of a series of tanks grouped about a horizontal axis, of a check valve in each container arranged to admit air thereto, a conduit for supplying milk to the said tanks, valve mechanism comprising a casing secured to one end of each of said tanks concentric with said axis and having ports communicating with said tanks, a plug within said casing having a port which communicates with the conduit and which is adapted to register with the casing ports successively, a valve casing secured to the opposite ends of the tanks concentric with said axis and having emptying ports communicating with the tanks, and a valve plug within the last mentioned casing having an emptying port adapted to register successively with the ports in said casing and also having a venting port angularly spaced from such emptying port and adapted to register with the ports in the last-mentioned casing thereby to vent each tank during the filling operation, the last-mentioned plug being provided with a port adapted to deliver milk that may leak from one of the said tanks through an emptying port in the last mentioned casing into a tank further remote from the emptying port in said plug.

3. In a system or apparatus for holding milk, the combination of a plurality of tanks grouped about a horizontal axis and means for rotating the said tanks about said axis, means for supplying milk successively to the said tanks during such rotation, and valve mechanism for emptying the said tanks and comprising a casing connected to corresponding ends of said tanks and surrounding the axis of rotation thereof, said casing having ports therein registering with said tanks, and a plug within the said casing, said plug having an emptying port adapted to register successively with the ports in the casing and with a venting port adapted to register successively with the ports in the said casing to vent the tanks during their respective filling operations, the valve plug being provided with a port adapted to conduct any milk that may leak from one tank to a tank further removed in point of time-interval from the emptying port.

4. In a system or apparatus for holding milk, the combination of a plurality of tanks grouped about a horizontal axis and means for rotating the said tanks about said axis, means for supplying milk successively to the said tanks during such rotation, and valve member for emptying the said tanks and comprising a valve connected to corresponding ends of said tanks and surrounding the axis of rotation thereof, said member having ports therein registering with said tanks, and a second valve member concentric with the first valve member and having an emptying port adapted to register successively with the ports in the other member and with a venting port adapted to register successively with the first mentioned ports to vent the tanks during their respective filling operations, one of said members being provided with a port adapted to conduct any milk that may leak from one tank to a tank further removed in time interval from the emptying port.

5. In a system or apparatus for holding milk, the combination, with a plurality of tanks grouped about a common axis and means for rotating said tanks about said axis, of a conduit for supplying milk to said tanks, a valve casing surrounding the axis of rotation of said tanks and connected to said tanks and having ports communicating with said tanks, a valve plug mounted within the valve casing and to which the conduit is connected, the said valve plug having a port adapted to register with the ports in the casing and of sufficient extent to overlap two adjacent ports simultaneously in said casing, means for emptying the said tanks successively when the milk therein shall have been held for a predetermined length of time, and means for venting the tanks during the filling and the emptying operation.

6. In a system or apparatus for holding milk, the combination, with a plurality of tanks grouped about a common axis and means for rotating said tanks about said axis, of a conduit for supplying milk to said tanks, a valve member surrounding the axis of rotation of said tanks, a valve member mounted within the former member, means connecting the conduit to one of said members, and the other member having ports communicating with said tanks, the member to which the conduit is connected having a port communicating with said conduit and of sufficient extent to overlap two adjacent ports simultaneously in the other member, means for emptying the said tanks successively when the milk therein shall have been held for a predetermined length of time, and means for venting the tanks during the filling and the emptying operation.

7. In an apparatus or system for holding milk, the combination, with a series of tanks and means for rotating the same about a horizontal axis, each tank having radial side walls and an inner and an outer wall, the inner wall of each tank sloping from one end thereof toward the opposite end thereof, valve mechanism carried by the corresponding ends of said tanks, the said mechanism having ports therein adapted to deliver milk successively into the adjacent end of each of the tanks, and valve mechanism at the opposite ends of the tanks, the second valve-mechanism having delivery ports adapted to communicate successively with each of the said tanks at a point closely adjacent to the inner wall thereof and at the junction of such wall with one of the side walls thereof, and means operative by one of said valve mechanisms for venting the tanks during the filling operation.

8. In an apparatus or system for holding milk, the combination, with a container and means for rotating the same about a horizontal axis, of a series of tanks within said container and arranged between the ends thereof, each tank having radial side walls and an inner wall, the inner walls of the tanks converging from one end of the container toward the opposite end thereof, valve mechanism carried by one end of said container, the said mechanism having ports therein adapted to deliver milk successively into one end of each of the tanks, and valve mechanism at the opposite end of the container and of the tanks therein, the second valve mechanism having delivery ports adapted to communicate successively with each of the said tanks at a point closely adjacent to the inner wall thereof and at the junction of such wall with one of the side walls thereof, and means operative by one of said valve mechanisms for venting the tanks during the filling operation.

9. In a system or apparatus for holding milk, the combination, with a rotary container having tanks therein grouped about its axis of rotation, of valve mechanism comprising concentric relatively rotary members one of which is secured to an end of said container surrounding the axis of rotation thereof, a conduit for milk connected with the other member of said valve mechanism, the valve members having ports arranged to deliver milk from the conduit successively to the said tanks by the rotation of the container, means for emptying each of said tanks when the milk therein shall have been held for a predetermined length of time, and means rendered operative by said valve mechanism for venting the said tanks during the filling operation.

10. In a system or apparatus for holding milk, the combination, with a series of tanks grouped about a horizontal axis, valve mechanism comprising concentric relatively rotary members one of which is secured to corresponding ends of said tanks surrounding the axis of rotation thereof, a conduit for milk connected with the other member of said valve mechanism, the valve members having ports arranged to deliver milk from the conduit successively to the said tanks by the rotation thereof, means for emptying each of said tanks when the milk therein shall have been held for a predetermined length of time, and means associated with said valve mechanism for venting the said tanks during the filling operation.

11. In a system or apparatus for holding milk, the combination of a plurality of tanks grouped about a horizontal axis, a conduit for supplying milk by gravity to said tanks, valve mechanism interposed between the said conduit and the said tanks and operating automatically by the rotation of the tanks to fill the tanks successively, the said valve mechanism being provided with means to prevent the creation of back pressure in said conduit, and a valve mechanism operating automatically to empty the said tanks successively after the milk therein shall have been held for a predetermined length of time, the second valve mechanism being provided with means for venting the tanks successively during the filling operation thereof and also being provided with means for delivering milk that may leak from one tank to a tank further removed from the emptying point of the second valve mechanism.

12. In a system or apparatus for holding milk, the combination of a plurality of tanks grouped about a horizontal axis, a conduit for supplying milk by gravity to said tanks, valve mechanism interposed between the said conduit and the said tanks and operating automatically by the rotation of the tanks to fill the tanks successively, and valve mechanism operating automatically to empty the said tanks successively after the milk therein shall have been held for a predetermined length of time, the second valve mechanism being provided with means for venting the tanks successively during the filling operation thereof.

13. In an apparatus or system for holding milk, the combination, with a rotary container having tanks provided therein, of a valve casing carried by one end of such container and surrounding the axis thereof, a non-rotatable plug in said casing, a conduit communicating with said plug, and cooperating ports in said plug and said casing for supplying milk from said conduit successively to the said tanks and by the rotation of said container, means for rotating said container, means controlled by such rotation for emptying the said tanks successively when the milk therein shall have been held for a predetermined length of time, and means associated with said valve mechanism and rendered operative by the rotation of said container for automatically venting each of the said tanks during the filling operation.

14. In an apparatus or system for holding milk, the combination with a series of tanks grouped about an axis, of a valve casing carried by adjacent ends of said tanks and surrounding the axis of rotation, a non-rotatable plug in said casing, a conduit communicating with said plug, cooperating ports in said plug and said casing for supplying milk from said conduit successively to the said tanks by the rotation of said tanks, means for rotating said tanks, means controlled by such rotation for emptying the said tanks successively when the milk therein shall have been held for a predetermined length of time, and means associated with said plug for automatically venting each of the said tanks during the filling operation.

15. In a system or apparatus for holding milk, the combination of a plurality of tanks arranged about a common axis, a conduit for supplying milk thereto, valve mechanism operative by the rotation of the tanks about said axis for filling the tanks successively, and valve mechanism, also operative by the rotation of said tanks, for emptying the same successively after the milk therein shall have been held for a predetermined length of time, said valve mechanism having means for venting each of said tanks during the filling operation.

16. In a system or apparatus for holding milk, the combination of a plurality of tanks arranged about a common horizontal axis, a conduit for supplying milk thereto, valve mechanism operative by the rotation of the tanks about said axis for filling the tanks successively, a second valve mechanism, also operative by the rotation of said tanks, for emptying the same successively after the milk therein shall have been held for a predetermined length of time, for venting each of said tanks during the filling operation, and for returning milk leaking from one of said tanks to another tank further remote from the emptying position.

17. In a system or apparatus for holding milk, the combination of a plurality of tanks arranged about a horizontal axis, means for rotating the said tanks about such axis, a filling conduit, valve mechanism interposed between said conduit and said tanks and operating by the rotation of said tanks to fill the said tanks successively, a second valve mechanism also connected with said tanks and operating automatically to empty the said tanks successively after the milk therein shall have been held for a predetermined length of time, and means associated with said second valve mechanism for preventing a back pressure in said filling conduit during the filling operation.

18. In a system or apparatus for holding milk, the combination of a plurality of tanks arranged about a common axis, means for rotating the said tanks about such axis, a filling conduit, valve mechanism interposed between said conduit and said tanks and operating by the rotation of said tanks to fill the said tanks successively, a second valve mechanism also connected with said tanks and grouped with the first mechanism and operating automatically to empty the said tanks successively after the milk therein shall have been held for a predetermined length of time, and means associated with said last mentioned valve mechanism to automatically vent said tanks respectively during the filling operation.

19. In a system or apparatus for holding milk, the combination of a rotary container having a plurality of tanks therein arranged about the axis of rotation of said container, means for supplying milk successively to the said tanks during the rotation of said container, and valve mechanism including means for preventing the creation of a back pressure in the supply conduit and having ports adapted, by such rotation, to deliver milk successively from the said tanks.

20. In a system or apparatus for holding milk, the combination of a rotary container having a plurality of tanks therein arranged about the axis of rotation of said container, and means including a conduit and a valve mechanism for supplying milk successively to the said tanks during the rotation of said container and having ports adapted, by such rotation, to deliver milk successively from the said tanks and provided with means for venting the tanks during the filling operation.

21. The combination, with a series of tanks grouped about a common axis of rotation, of means for supplying milk to such tanks successively, the said means comprising a casing secured to corresponding ends of said tanks and provided with ports communicating therewith, a plug having a port adapted to register with the ports in the casing successively, a conduit detachably connected with said plug and adapted to communicate with the port thereof, and anchoring means for said plug permitting the latter to be applied to and removed from its seat in said casing, and means associated with said plug for automatically venting said tanks during the filling operation.

22. In a system or apparatus for holding milk, the combination of a rotary container having a plurality of tanks therein arranged about the axis of rotation of said container, means for supplying milk successively to said tanks during the rotation of said container including valve mechanism having ports adapted, by such rotation, to deliver milk successively from the said tanks, said valve mechanism being provided with means for venting the tanks during the filling operation, and means associated with said valve mechanism for delivering milk that may leak from one of said tanks into another of said tanks.

23. In a system or apparatus for holding milk, the combination of a plurality of tanks arranged about a horizontal axis, means for rotating said tanks about such axis, a filling conduit, a valve mechanism operated by the rotation of said tanks to fill the said tanks successively and to empty the said tanks successively after the milk therein shall have been held for a predetermined length of time, means associated with said valve mechanism for preventing a back pressure in said filling conduit, and means for delivering the milk that may leak from one of said tanks into another of said tanks.

24. A milk holding apparatus of the character described comprising a container having a plurality of partitions therein dividing the same into a series of compartments arranged about a common axis, each compartment having an inlet therein through which the same may be filled, and an outlet connection common to all of said compartments through which the contents of each compartment may be discharged, means for rotating said container whereby the compartments are filled successively through the rotation thereof and are emptied successively by reason of such rotation, the contents of said compartments being maintained in a state of agitation due to such rotation and the bottoms of the said compartments sloping toward the outlet thereof whereby to produce a natural drainage toward the outlet, the said compartments being so arranged that each compartment is filled as it is brought below the axis of rotation.

25. A milk holding apparatus of the character described comprising a container, said container having a plurality of partitions therein dividing the same into a series of compartments arranged about a common axis, each compartment having an inlet therein through which it is filled as it is moved below the axis of rotation, an outlet common to all of said compartments and through which the contents of each compartment is discharged, the bottom of each compartment sloping toward the outlet thereof whereby to produce a natural drainage toward the outlet, the compartments being so arranged that both the filling and emptying operations are accomplished by gravity, means for rotating said container whereby the compartments are filled successively through such rotation and are emptied successively by reason of such rotation, the shape of the compartments being such that the contents thereof are maintained in a state of agitation due to such rotation.

In testimony whereof, I hereunto affix my signature.

BARGE L. HARTZ.